United States Patent
Shim et al.

(10) Patent No.: US 10,539,734 B2
(45) Date of Patent: Jan. 21, 2020

(54) DIRECTIONAL BACKLIGHT UNIT, METHOD FOR MANUFACTURING THE SAME, AND 3D IMAGE DISPLAY APPARATUS HAVING THE SAME

(71) Applicant: SAMSUNG ELECTRONICS CO., LTD., Suwon-si (KR)

(72) Inventors: Dongsik Shim, Hwaseong-si (KR); Dongouk Kim, Pyeongtaek-si (KR); Hyunjoon Kim, Seoul (KR); Joonyong Park, Suwon-si (KR); Jihyun Bae, Seoul (KR); Bongsu Shin, Seoul (KR); Sunghoon Lee, Seoul (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 15/418,119

(22) Filed: Jan. 27, 2017

(65) Prior Publication Data
US 2018/0024287 A1 Jan. 25, 2018

(30) Foreign Application Priority Data
Jul. 22, 2016 (KR) ........................ 10-2016-0093463

(51) Int. Cl.
*F21V 8/00* (2006.01)
(52) U.S. Cl.
CPC ......... *G02B 6/0038* (2013.01); *G02B 6/0065* (2013.01)

(58) Field of Classification Search
CPC ... G02B 6/0038; G02B 6/0053; G02B 6/0061
See application file for complete search history.

(56) References Cited

U.S. PATENT DOCUMENTS

| | | | | |
|---|---|---|---|---|
| 4,426,130 A * | 1/1984 | Knop | .................. | G02B 5/1823 359/569 |
| 4,509,823 A * | 4/1985 | Moriguchi | ........... | G03B 21/625 359/457 |
| 6,147,732 A * | 11/2000 | Aoyama | .............. | G02B 5/3083 349/112 |
| 6,373,634 B1 * | 4/2002 | Nishikawa | ........... | G02B 3/0031 359/455 |
| 6,424,786 B1 * | 7/2002 | Beeson | ................ | G02B 3/0031 385/146 |
| 7,339,638 B2 * | 3/2008 | Kitamura | .......... | G02F 1/133526 349/5 |
| 9,128,226 B2 | 9/2015 | Fattal et al. | | |

(Continued)

FOREIGN PATENT DOCUMENTS

| | | |
|---|---|---|
| JP | 4470388 B2 | 3/2010 |
| JP | 2014-21501 A | 2/2014 |
| KR | 10-2015-0128719 A | 11/2015 |

*Primary Examiner* — Anh T Mai
*Assistant Examiner* — Zachary J Snyder
(74) *Attorney, Agent, or Firm* — Sughrue Mion, PLLC (57) ABSTRACT

A directional backlight unit is provided, including a light guide plate, a light source, and a grating that is formed on a light-emitting surface of the light guide plate. The grating is configured such that an intensity of one ray of light, of the light irradiated by the light source and diffracted and emitted by the grating, is greater than a sum of intensities of all other rays of light, of the light irradiated by the light source and diffracted and emitted by the grating.

10 Claims, 8 Drawing Sheets

(56) References Cited

U.S. PATENT DOCUMENTS

| | | | |
|---|---|---|---|
| 9,678,379 B2* | 6/2017 | Hong | G02F 1/133524 |
| 9,774,011 B2* | 9/2017 | Choi | H01L 51/5275 |
| 9,874,666 B2* | 1/2018 | Lee | G02B 5/0236 |
| 10,048,409 B2* | 8/2018 | Lee | G02B 3/005 |
| 2012/0286258 A1* | 11/2012 | Naraoka | C09K 11/06 |
| | | | 257/40 |
| 2016/0018582 A1 | 1/2016 | Fiorentino et al. | |
| 2016/0187699 A1* | 6/2016 | Ju | G02F 1/133528 |
| | | | 349/65 |
| 2018/0267359 A1* | 9/2018 | Niu | H04N 13/302 |

* cited by examiner

DIRECTIONAL BACKLIGHT UNIT, METHOD FOR MANUFACTURING THE SAME, AND 3D IMAGE DISPLAY APPARATUS HAVING THE SAME

CROSS-REFERENCE TO RELATED APPLICATION

This application claims priority from Korean Patent Application No. 10-2016-0093463, filed on Jul. 22, 2016, in the Korean Intellectual Property Office, the disclosure of which is incorporated herein in its entirety by reference.

BACKGROUND

1. Field

Apparatuses and methods consistent with exemplary embodiments relate to directional backlight units, methods of manufacturing the same, and a three dimensional (3D) image display apparatus having the same.

2. Description of the Related Art

Recently, many of 3D movies have been produced. Accordingly, many of studies have been conducted regarding techniques related to 3D image display devices. Many currently-commercialized 3D image display device display 3D images based on the principal of binocular parallax. Such a 3D image display device provides a 3D effect to a viewer by respectively providing a left eye image and a right eye image, that are captured at different times, to a left eye and a right eye of the viewer. 3D image display devices may be classified as glasses-type 3D image display devices which require the use of special glasses, and glasses-free 3D image display devices which do not require the use of glasses.

Glasses-type 3D image display devices may use a red-green method. In the case of 3D televisions (TVs), a polarized glasses method or a liquid crystal shutter method may be used. Glasses-free 3D image display devices may be classified as barrier method type devices or a lenticular method type devices, according to their structures. Glasses-free 3D image display devices may operate according to a multi-view rendering method; a volumetric method; in which all information of a 3D space is included and is displayed it in a 3D space with voxels; an integral imaging method in which, after obtaining images focused through lenses having compound eyes (fly eyes) of various angles, the images are displayed in a reversed manner; a holographic method; or a directional backlight unit method.

According to the directional backlight unit method, a 3D image may be realized by controlling an emission direction of light using a grating. The grating diffracts light in various directions and light in a single direction may be utilized for realizing a 3D image.

SUMMARY

One or more exemplary embodiments provide directional backlight units, methods of manufacturing the directional backlight units, 3D image display apparatuses including the directional backlight unit.

Additional exemplary aspects and advantages will be set forth in part in the description which follows and, in part, will be apparent from the description, or may be learned by practice of the exemplary embodiments.

According to an aspect of an exemplary embodiment, a directional backlight unit includes: a light guide plate; a light source that irradiates light to the light guide plate; and a grating that is formed on a light-emitting surface of the light guide plate and has a grating shape that allows an intensity of one ray of light that is diffracted and emitted by the light guide plate to be greater than the sum of intensities of other rays of light that is diffracted and emitted by the light guide plate or allows only a single ray of light to be diffracted and emitted by the light guide plate.

The grating of the light guide plate may include a lower grating formed into the light-emitting surface of the light guide plate, and an upper grating connected to the lower grating.

The lower grating may include round furrows periodically formed in the light-emitting surface of the light guide plate, and the upper grating may include round ridges formed between the round furrows.

The round ridges and the round furrows may be smoothly connected to each other, thereby forming a sinusoidal wave shape.

The light guide plate may include a thermal resistance material that is transparent with respect to visible light, and the grating may include a polymer material that is transparent with respect to visible light.

The grating and the light guide plate may include materials having substantially the same refractive index.

The grating may have a sinusoidal wave shape.

The grating and the light guide plate may include materials having substantially the same refractive index.

The grating may include a transparent resin material.

The grating is configured such that a square of a first Fourier coefficient of a Fourier transformation performed on the shape of the grating is greater than a sum of squares of remaining Fourier coefficients including a second Fourier coefficient of the Fourier transformation.

The grating may be configured such that Fourier coefficients, except a first Fourier coefficient, of a Fourier transformation performed on the shape of the grating, are substantially zero.

According to an aspect of another exemplary embodiment, a 3D image display device includes: a directional backlight unit described above; and a display panel that is formed on the light-emitting surface of the directional backlight unit and forms an image by using light emitted through the directional backlight unit.

According to an aspect of another exemplary embodiment, a method of manufacturing a directional backlight unit, the method includes: forming a lower grating having a plurality of round furrows periodically spaced on a first light guide plate; and forming an upper grating having a plurality of round ridges between the round furrows, wherein the lower grating and the upper grating are smoothly connected to each other and, together, form a sinusoidal wave shape.

The forming of the lower grating may include: disposing a first mask pattern having a plurality of openings that are periodically spaced on the first light guide plate; etching the first light guide plate through the openings by isotropic etching; and removing the first mask pattern from the first light guide plate.

The forming of the upper grating may include: disposing a second mask pattern exposing remaining part of the first light guide plate except the round furrows; depositing a grating material on the first light guide plate through the second mask pattern; removing the second mask from the first light guide plate; and forming a plurality of the round ridges by processing the grating material using a reflow process.

According to an aspect of another exemplary embodiment, a method of manufacturing a directional backlight unit, the method includes: providing the directional backlight unit as a master mold; forming a stamp by transferring the master mold; and forming a grating having a sinusoidal wave shape by using the stamp.

The forming of the stamp may include: imprinting the stamp with the master mold; and removing the stamp from the master mold.

The forming of the grating may include: providing a second light guide plate and an imprinting layer on the second light guide plate; imprinting the imprinting layer with the stamp, thereby forming the grating having the sinusoidal wave shape in the imprinting layer; and removing the stamp from the imprinting layer.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Directional backlight units, methods of manufacturing the directional backlight unit, and 3D image display apparatuses will now be described in detail with reference to exemplary embodiments which are illustrated in the accompanying drawings.

In the drawings, like reference numerals refer to like elements throughout and sizes of each constituent element may be exaggerated for clarity and explanation convenience. It will be understood that although the terms "first", "second", etc. may be used herein to describe various components, these components should not be limited by these terms. These components are only used to distinguish one component from another.

The singular forms are intended to include the plural forms as well, unless the context clearly indicates otherwise. It should be understood that, when a part "comprises" or "includes" an element in the specification, unless otherwise defined, it is not excluding other elements but may further include other elements.

Figure 1:
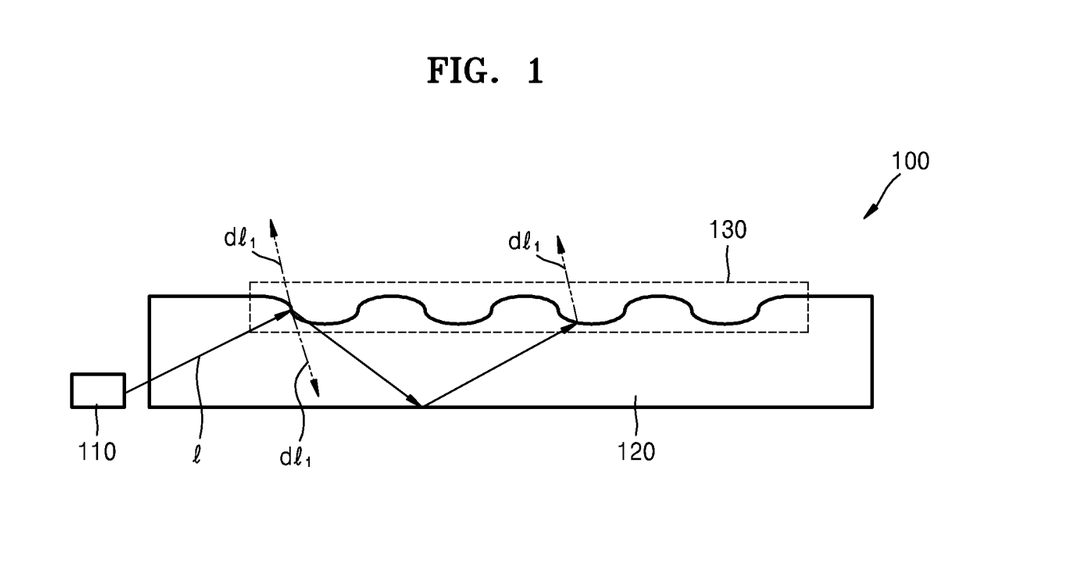
FIG. 1 is a schematic cross-sectional view of a directional backlight unit according to an exemplary embodiment.

FIG. 1 is a schematic cross-sectional view of a directional backlight unit 100 according to an exemplary embodiment.

Referring to FIG. 1, the directional backlight unit 100 may include a light source 110, a light guide plate 120, and a grating 130.

Light may be irradiated towards the light guide plate 120 from the light source 110. For example, the light source 110 may irradiate light of any of various colors. For example, the light source 110 may include a light-emitting diode (LED) of a laser diode (LD). However, the light source 110 according to the current exemplary embodiment is not limited thereto, that is, a light source that emits light in a plurality of wavelengths may be used.

The light guide plate 120 may have any of various shapes through which light is guided by total internal reflection. For example, the light guide plate 120 may have a rectangular shape or a curved rectangular shape. The light guide plate 120 may guide light, emitted from the light source 110, to be emitted to an outside of the light guide plate 120 through a light-emitting surface of the light guide plate 120 by guiding the light via total internal reflection.

The grating 130 may diffract light emitted through the light-emitting surface of the light guide plate 120 from within the light guide plate 120. The direction and intensity of the diffracted light may vary according to the shape of the grating 130. For example, when the grating 130 has a sinusoidal wave shape or a shape close to a sinusoidal wave shape, virtually no light having a high diffraction order may be diffracted or light having a high diffraction order may be emitted with a very low intensity. Refracted that is reflected at a boundary surface when light enters a surface of the grating 130 with an angle at which a total reflection of the light may not occur in the internal of the light guide plate 120 is not included in the diffracted light.

Using the directional backlight unit 100, of an entirety of diffracted light output in many directions, respectively corresponding to many diffraction orders, light output in only a single direction, that is, light of only a single diffraction order, is required for displaying an image. Thus, optical efficiency may be reduced in view of the light of different diffraction orders, output in different directions, which is not used in the display of the image. Accordingly, the directional backlight unit 100 may include a grating 130 that emits only a single ray of light or that emits only light with low diffraction orders, to increase the optical efficiency of the directional backlight unit 100.

Figure 2:
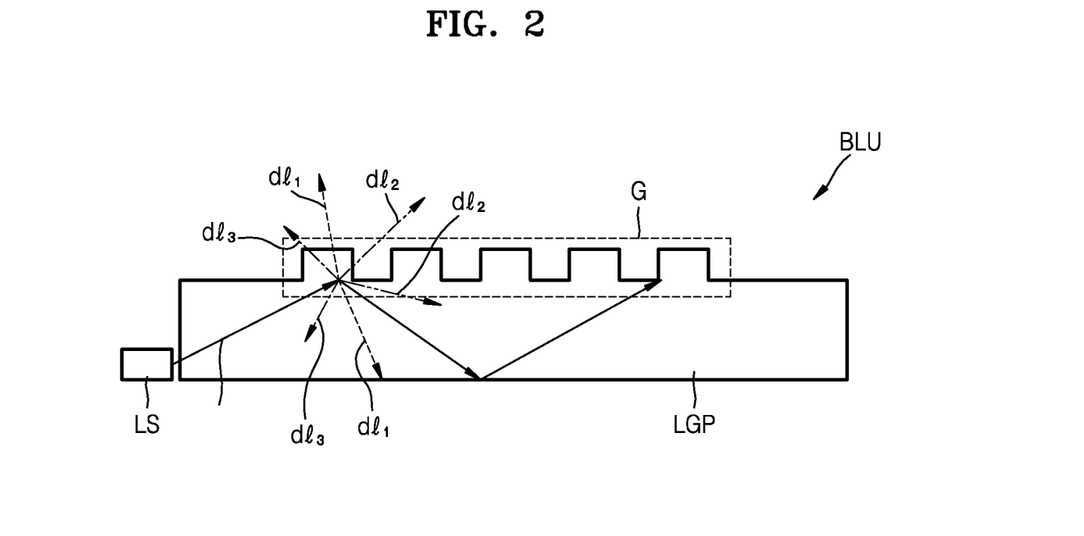
FIG. 2 is a schematic cross-sectional view of a directional backlight unit according to a comparative example.

The grating 130 according to the current exemplary embodiment may have a grating shape that enables it to emit only a single ray of diffracted light dl1, or to emit diffracted light dl1 having an intensity greater than a sum of the intensities of a plurality of higher-order diffracted light dl2 and dl3 (refer to FIG. 2). The grating 130 has a shape comprising a periodically repeating function, and the functional may be expressed as a Fourier transform series. Accordingly, the shape of the grating 130 may correspond to various orders of Fourier coefficients including a first Fourier coefficient, and the intensity of diffracted light corresponding to the diffraction order may be proportional to the square of the Fourier coefficient. For example, the intensity of the first order diffracted light dl1 is proportional to the square of the first Fourier coefficient, and the intensity of a second order diffracted light (not shown) may proportional to the square of a second Fourier coefficient. Accordingly, in order to obtain a diffraction grating which outputs light of a desired number diffraction orders and their intensities, those skilled in the art may design the shape of the grating 130 indicated by a Fourier coefficient after determining the Fourier coefficient in advance.

The grating 130 may be configured to have a grating shape which satisfies a condition in which a square of the first Fourier coefficient is greater than the sum of the squares of the remaining Fourier coefficients when performing a Fourier transformation. For example, a grating shape that satisfies the above condition may be a sinusoidal wave shape or a shape which is approximately a sinusoidal wave shape. When the grating shape is a sinusoidal wave shape, coefficients other than the first Fourier coefficient may be substantially zero. When the grating has a shape approximating a sinusoidal wave shape, Fourier coefficients of low orders, including the first and second Fourier coefficients, may be sufficiently greater than the high order Fourier coefficients. For example, if the grating 130 has a shape approximating a sinusoidal wave shape, diffracted light with low diffraction orders are emitted. Referring to FIG. 1, the grating 130 may have a sinusoidal wave shape configured to emit a single ray of the first order diffracted light dl1.

FIG. 2 is a schematic cross-sectional view of a directional backlight unit BLU according to a comparative example. Referring to FIG. 2, the directional backlight unit BLU may include a light source LS, a light guide plate LGP, and a grating G.

The directional backlight unit BLU according to the comparative example may include a line and space type grating. The grating G may diffract light in various directions when the light that proceeds through the light guide plate LGP enters the grating G with a constant angle. As described above, when performing a Fourier transformation, a value of each of the Fourier coefficients may determine the number of rays of the diffracted light and the intensity of the light. The grating G may diffract incident light in various diffraction orders, thereby converting incident light into output diffracted light dl1, dl2, and dl3. In this way, the directional backlight unit BLU may have an optical efficiency that is lower than that of the exemplary directional backlight unit 100.

Figure 3:
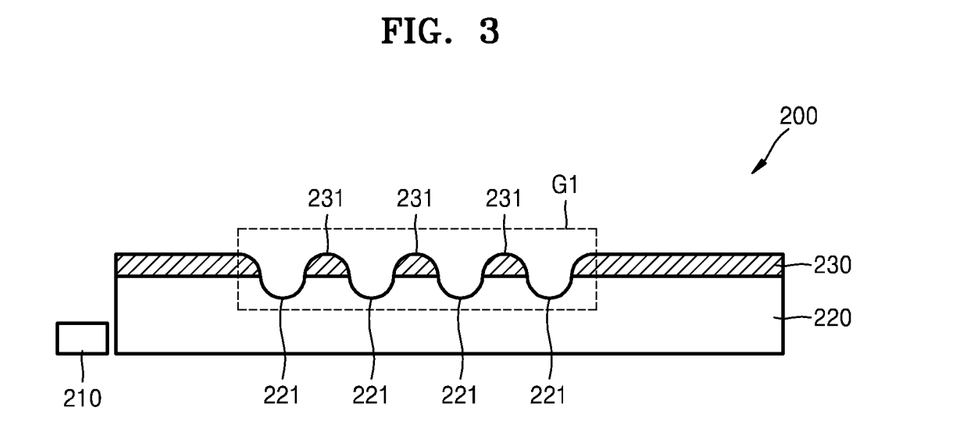
FIG. 3 is a schematic cross-sectional view of a directional backlight unit according to another exemplary embodiment.

FIG. 3 is a schematic cross-sectional view of a directional backlight unit 200 according to another exemplary embodiment. Referring to FIG. 3, the directional backlight unit 200 may include a light source 210, a light guide plate 220, and a upper grating layer 230. The light source 210 is substantially the same as the light source 110 of FIG. 1, and thus, the description thereof will not be repeated.

The light guide plate 220 may include a lower grating 221 on a light-emitting surface. The lower grating 221 may have a shape corresponding to a part (a lower part) of the grating shape, which may be a sinusoidal wave shape or a shape approximating a sinusoidal wave shape. For example, the lower grating 221 may comprise periodically spaced round furrows formed in a surface of the light guide plate 220.

The light guide plate 220 may include a material which is transparent with respect to light output by the light source 210. For example, if the light source 210 emits visible light, the light guide plate 220 may include a material which is transparent with respect to visible light. The light guide plate 220 may include a thermal resistance material. For example, the light guide plate 220 may include a thermally-resistant glass or plastic material. The light guide plate 220 may include poly methyl methacrylate (PMMA).

The upper grating layer 230 may include an upper grating 231. The upper grating 231 and the lower grating 221 together may form grating G1. The grating G1 may have a sinusoidal wave shape. For example, the upper grating 231 may have a shape corresponding to a part (upper part) of the grating shape. For example, the upper grating 231 may include round ridges provided between round furrows. For example, the round ridges and the round furrows are smoothly connected to each other to form a sinusoidal wave shape or a shape close to the sinusoidal wave shape.

The upper grating 231 may be formed by using a reflow process. The upper grating 231 may include a material that is transparent with respect to light emitted from the light source 210. The upper grating 231 and the light guide plate 220 may be formed of materials having substantially the same refractive index. For example, the upper grating 231 may include a solder material that is typically used in a reflow process. For example, the upper grating 231 may include an ultraviolet ray hardening material of an acryl group or a urethane group.

The directional backlight unit 200 may be manufactured by using processes depicted in FIGS. 5 through 11, which will be described in detail below.

Figure 4:
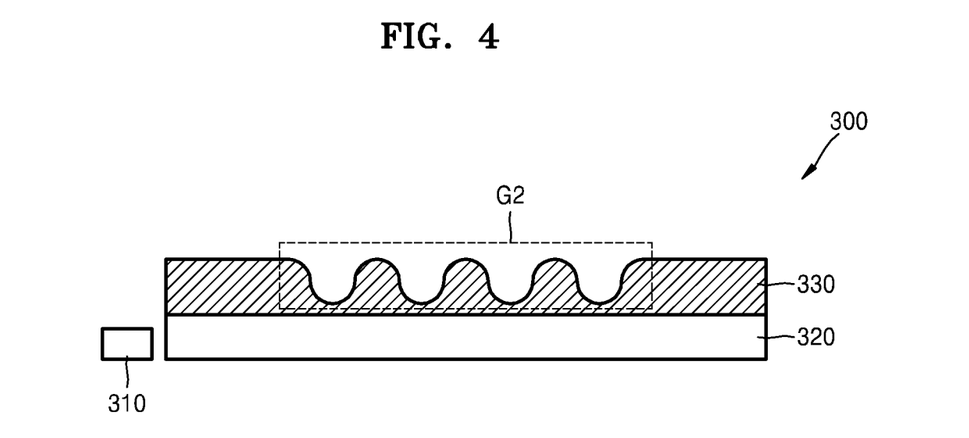
FIG. 4 is a schematic cross-sectional view of a directional backlight unit according to another exemplary embodiment.

FIG. 4 is a schematic cross-sectional view of a directional backlight unit 300 according to another exemplary embodiment. The directional backlight unit 300 may include a light source 310, a light guide plate 320, and a grating layer 330, disposed on the light guide plate 320.

The grating layer 330 may be formed on a surface of the light guide plate 320. The grating layer 330 may include a grating G2. The grating G2 may have the same shape as the grating G1 (refer to FIG. 3) described above. The grating layer 330 may include a resin material. The grating layer 330 and the light guide plate 320 may have substantially the same refractive index.

The directional backlight unit 300 may be manufactured by using processes depicted in FIGS. 12 through 17, which will be described in detail below.

FIGS. 5 through 10 are cross-sectional views illustrating a method of manufacturing the directional backlight unit of FIG. 3.

Figure 5:
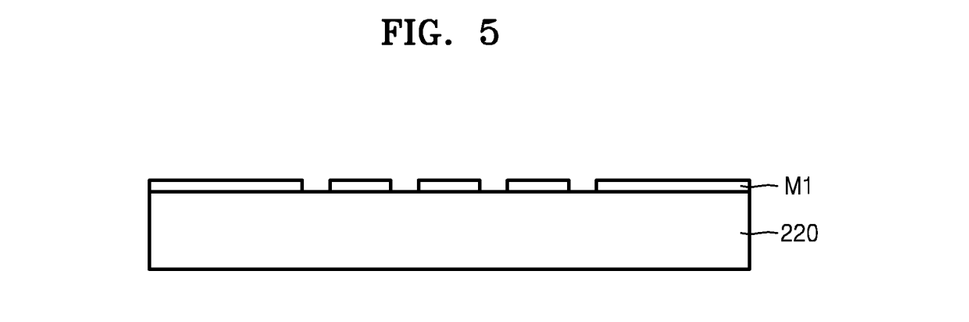
FIGS. 5 through 10 are cross-sectional views illustrating an exemplary method of manufacturing the directional backlight unit of FIG. 3.

Referring to FIG. 5, a first mask pattern M1, including a plurality of periodically-spaced openings, is formed on the light guide plate 220. The plurality of openings may respectively expose portions of a light-emitting surface of the light guide plate 220.

Figure 6:
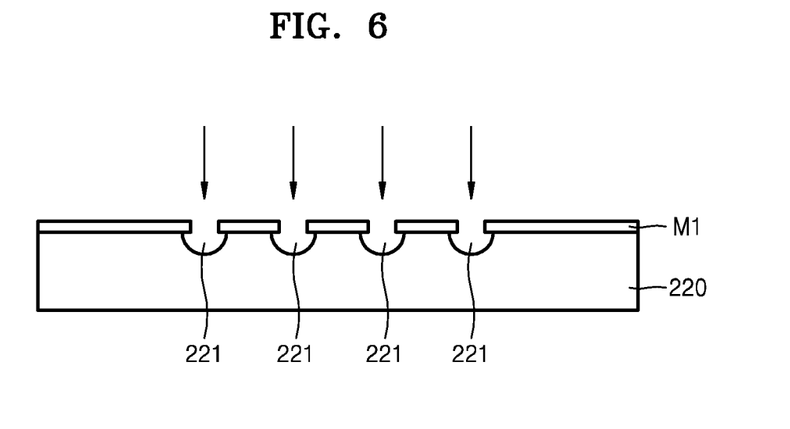

Referring to FIG. 6, the lower grating 221 is formed in the portions of the light guide plate 220 respectively exposed through the plurality of openings. The lower grating 221 may be formed by anisotropic etching of the portions of the light guide plate 220 exposed through the openings by using the first mask pattern M1 as an etch mask. For example, the lower grating 221 may be formed by using a wet etching.

Figure 7:
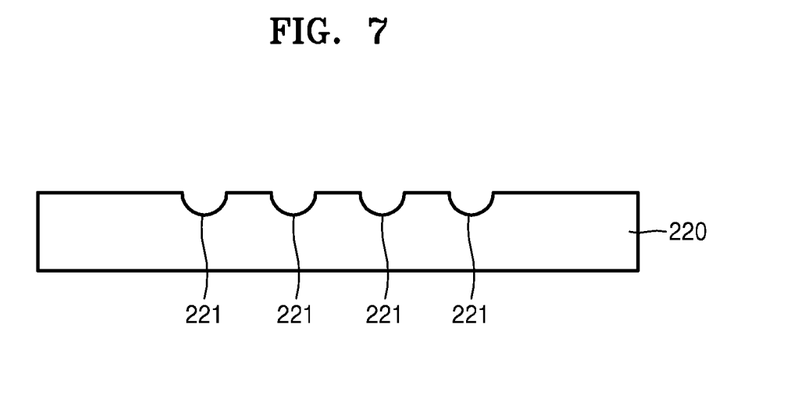

Referring to FIG. 7, the first mask pattern M1 is removed from the light guide plate 220.

Figure 8:
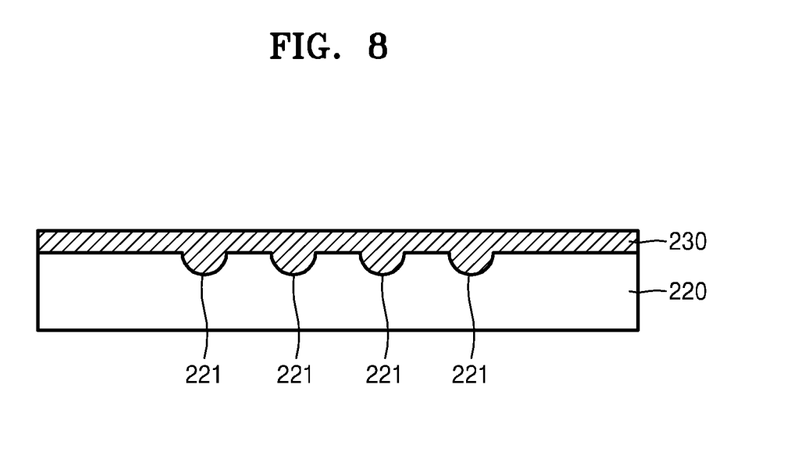

Referring to FIG. 8, a upper grating layer 230 may be deposited on the light guide plate 220. The upper grating layer 230 may be deposited on the light-emitting surface of the light guide plate 220 in which the lower grating 221 is formed. The upper grating layer 230 may be a material having substantially the same refractive index as that of the light guide plate 220. The upper grating layer 230 may be a transparent solder material used in a reflow process.

Figure 9:
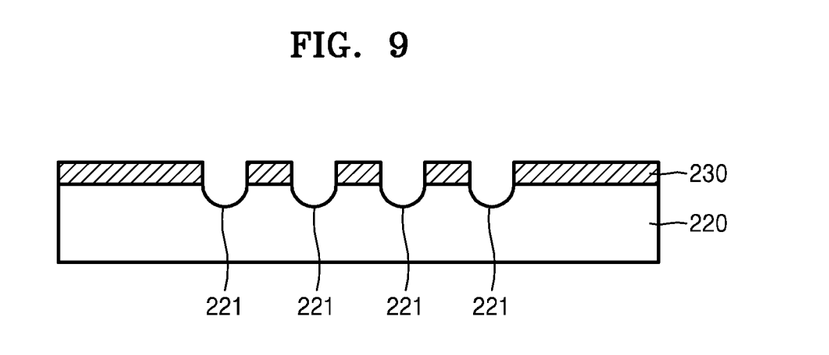

Referring to FIG. 9, the upper grating layer 230 deposited on the lower grating 221 may be partially removed. For example, a second mask pattern M2 (not shown) may include a plurality of periodically spaced openings. The lower grating 221 may be exposed by isotropic etching of the upper grating layer 230 using the second mask pattern M2 as an etch mask.

Figure 10:
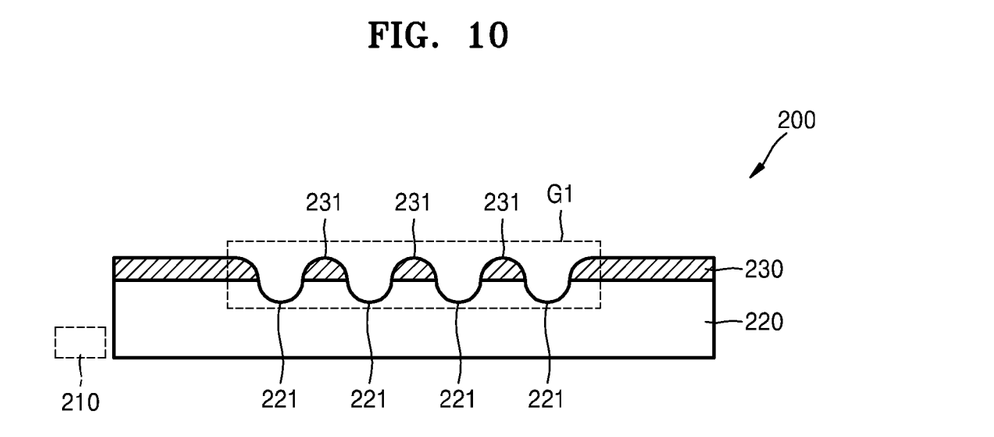

Referring to FIG. 10, the upper grating 231 may be formed by changing the shape of the upper grating layer 230 through a reflow process. During the reflow process, the portions of the upper grating layer 230, between adjacent portions of the lower grating 221, may be transformed by heat to have a round ridge shape, and thus, the upper grating 231 may be formed. The upper grating 231 and the lower grating 221 may be smoothly connected to each other, and thus, a grating G1 having a sinusoidal wave shape may be formed.

The directional backlight unit 200 may include the light guide plate 220, the upper grating 231, the lower grating 221, and the light source 210 that are formed according to the processes of FIGS. 5 through 10. In this way, the directional backlight unit 200 may include an upper grating 231 and a lower grating 221 that are formed of different materials. Accordingly, the optical efficiency of the directional backlight unit 200 may be increased if the refractive indexes of the upper grating layer 230 and the light guide plate 220 are substantially the same or at least by decreasing the refractive index difference therebetween.

FIGS. 11 through 16 are cross-sectional views illustrating a method of manufacturing the directional backlight unit 300 of FIG. 4.

Figure 11:
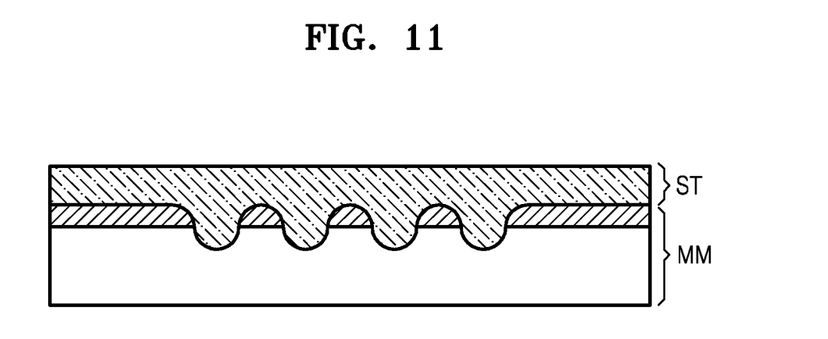
FIGS. 11 through 16 are cross-sectional views illustrating an exemplary method of manufacturing the directional backlight unit of FIG. 4.

Referring to FIG. 11, the directional backlight unit 200 of FIG. 10 may be used as a master mold MM. A stamp ST may be deposited on the master mold MM. The stamp ST may include any of various materials, and is not specifically limited. For example, the stamp ST may be made to be durable by including a hard material.

Figure 12:
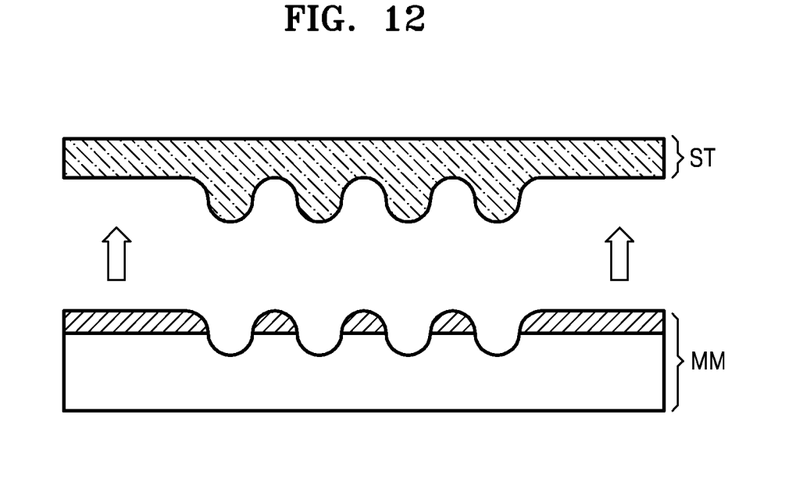

Referring to FIG. 12, the stamp ST may be separated from the master mold MM.

Figure 13:
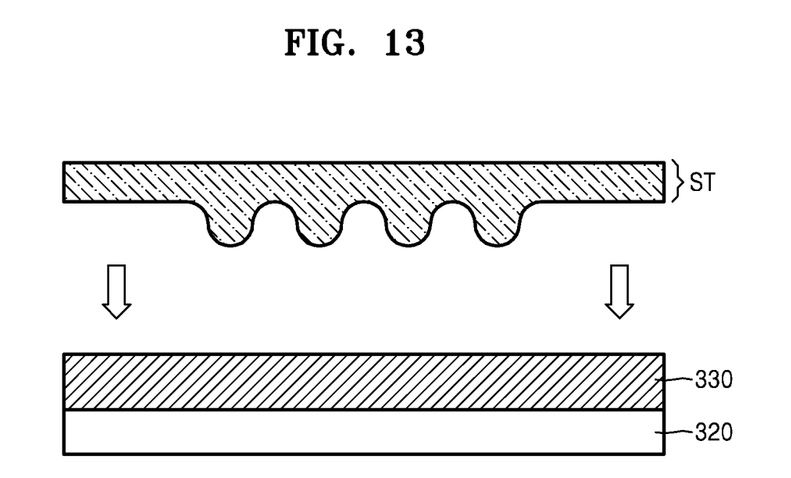

Referring to FIG. 13, a second light guide plate 320 and an grating layer 330 disposed on the second light guide plate 320 may be provided. The grating layer 330 is a layer onto which a grating is transferred by being imprinted with the surface shape of the stamp ST through a physical combination with the stamp ST. The grating layer 330 may include a material which is variable by application of pressure and/or heat. For example, the grating layer 330 may include a transparent resin material or a transparent polymer material.

Figure 14:
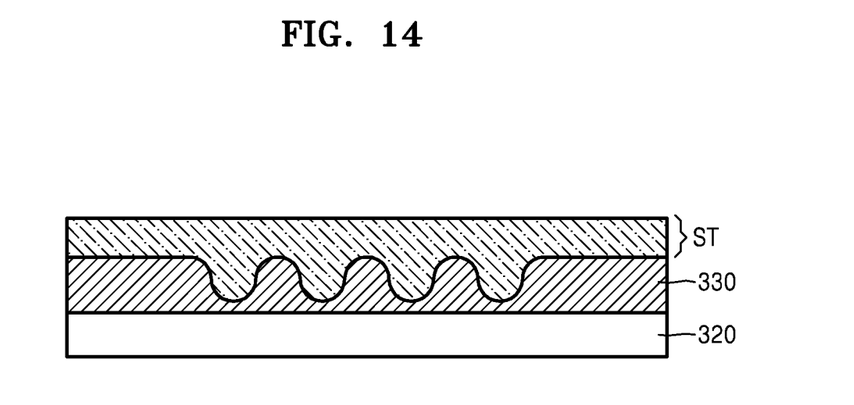

Referring to FIG. 14, a grating having a sinusoidal wave shape may be formed by transferring the surface shape of the stamp ST onto the grating layer 330. For example, a surface shape of the grating layer 330 may be changed to be substantially identical to the grating shape of the master mold MM by physically pressing the stamp ST onto the grating layer 330.

Figure 15:
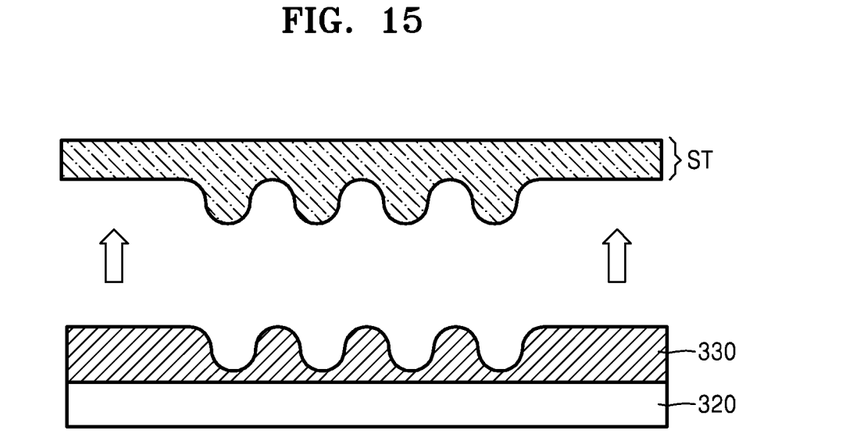

Referring to FIG. 15, the stamp ST may be removed from the grating layer 330.

Figure 16:
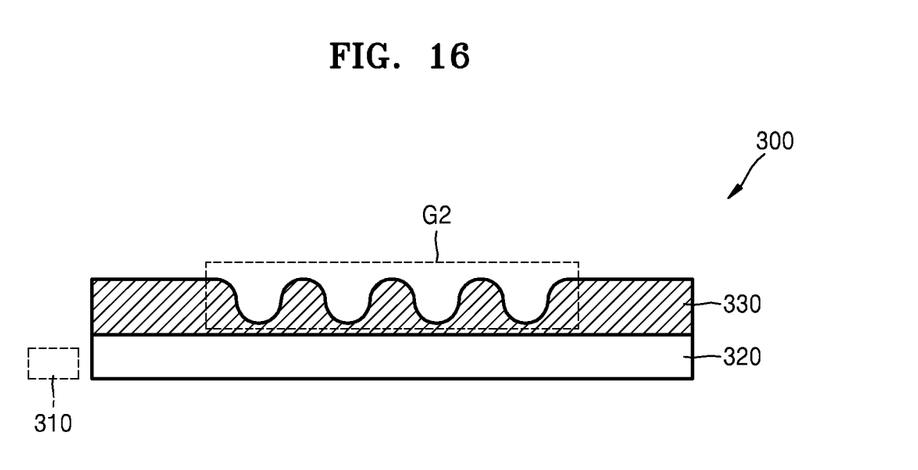

Referring to FIG. 16, the directional backlight unit 300 may be formed. The directional backlight unit 300 may include the light guide plate 320, the grating layer 330 that includes the grating G2, and the light source 310.

The directional backlight unit 300 formed through the processes described with reference to FIGS. 11 through 16 may include the grating G2 having a grating shape which is substantially the same as (a reverse of) the grating shape of the grating of the directional backlight unit 200, which is a master mold.

The stamp ST is not for a single use, but may be used several times for imprinting processes. Therefore, mass production of the directional backlight unit 300 is possible, thereby reducing manufacturing costs and increasing process efficiency.

Figure 17:
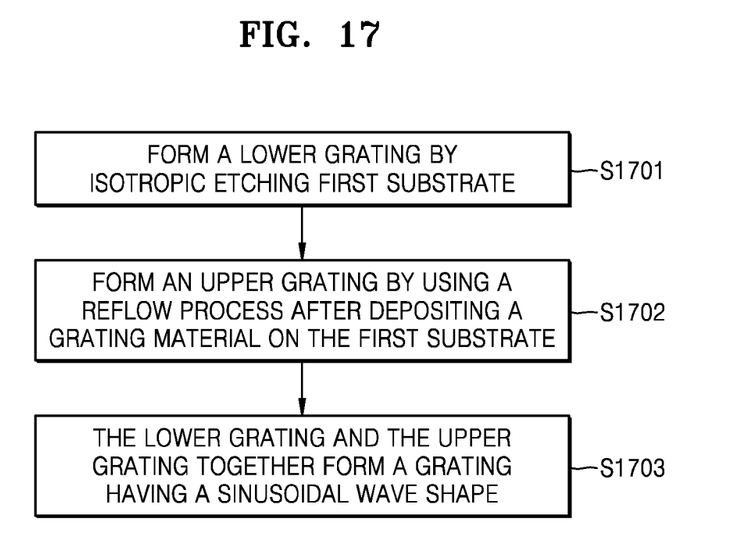
FIG. 17 is a flowchart of an exemplary method of manufacturing the directional backlight unit of FIG. 3.

FIG. 17 is a flowchart of an exemplary method of manufacturing the directional backlight unit of FIG. 3.

Referring to FIG. 17, in the first directional backlight unit 200 (refer to FIG. 3), a lower grating is formed by isotropic etching of a first substrate (S1701); an upper grating is formed by using a reflow process after depositing a grating material on the first substrate (S1702); and the lower grating and the upper grating together form a grating having a sinusoidal wave shape (S1703).

Figure 18:
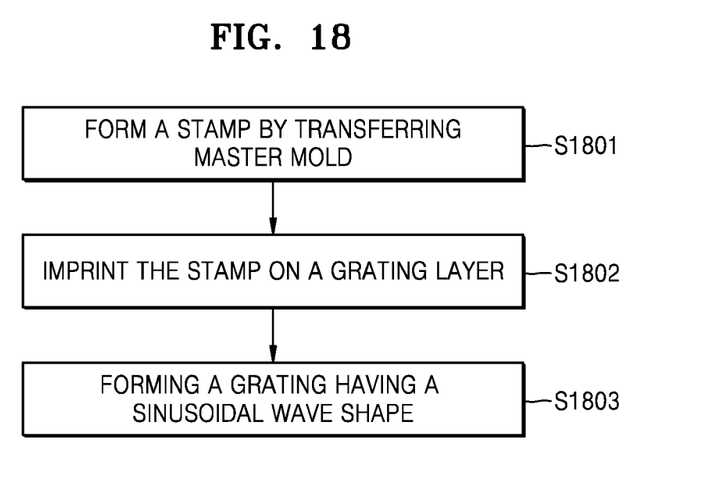
FIG. 18 is a flowchart of an exemplary method of manufacturing the directional backlight unit of FIG. 4.

FIG. 18 is a flowchart of a method of manufacturing the directional backlight unit of FIG. 4.

Referring to FIG. 18, a stamp is formed by transferring master mold, which is the first directional backlight unit 200 (refer to FIGS. 10 and 11) (S1801), the stamp is imprinted on a grating layer (S1802), and grating having a sinusoidal wave shape is formed by removing the stamp from the grating layer (S1803).

The directional backlight unit according to the exemplary embodiments embodiment described above may be utilized as part of a 3D image display device. Such a 3D image display device may include the directional backlight unit and a display panel.

The display panel may include, for example, a liquid crystal display. The display panel may include, for example, a plurality of pixels arranged in a matrix structure, and the plurality of pixels may include sub-pixels respectively corresponding to light of different colors. For example, a 3D image display device may display 20 views. Here, a view may denote a single image viewed on a single eye of a viewer. However, the view is not limited thereto, that is, it is possible that more than two views are displayed on a single eye of the viewer.

In the directional backlight unit according to the current exemplary embodiment, optical efficiency may be increased by allowing the intensity of a single ray of diffracted and emitted light greater than the sum of intensities of remaining rays or by allowing a single ray of light is diffracted and emitted.

The 3D image display device according to the current exemplary embodiment may increase optical efficiency by including a directional backlight unit.

The method of manufacturing a directional backlight unit according to the current exemplary embodiment may readily form a directional backlight unit having a sinusoidal wave shape grating. Also, a stamp is formed based on a directional backlight unit once formed ahead, and thus, mass production of the directional backlight units may be possible through an imprinting process.

While the exemplary embodiments of directional backlight units, methods of manufacturing the directional backlight units, and 3D image display devices including the directional backlight unit have been described in detail with reference to accompanying drawings, in which embodiments of the inventive concept are shown, to facilitate understanding of the inventive concept. However, it should be understood that embodiments described herein should be considered in a descriptive sense only and not for purposes of limitation. Also, it should be understood that the inventive concept is not limited to the exemplary embodiments described above because various changes in form and details may be made by those of ordinary skill in the art.

What is claimed is:

1. A directional backlight unit comprising:
   a light guide plate;
   a light source that irradiates light to the light guide plate; and
   a grating formed on a light-emitting surface of the light guide plate, wherein a shape of the grating is configured such that an intensity of one ray of light, of the light irradiated by the light source and diffracted and emitted by the grating is greater than a sum of intensities of all other rays of light, of the light irradiated by the light source and diffracted and emitted by the grating, wherein the grating comprises a lower grating formed into the light-emitting surface of the light guide plate, and an upper grating connected to the lower grating, and wherein the lower grating comprises a plurality of round furrows periodically formed in the light-emitting surface of the light guide plate, each of the plurality of round furrows is spaced apart by a flat area of the light-emitting surface of the light guide plate, and the upper grating comprises a plurality of round ridges alternatingly disposed with the plurality of round furrows, each of the plurality of round ridges is directly contacted to the flat area of the light-emitting surface of the light guide plate and protrudes from the light guide plate.

2. The directional backlight unit of claim 1, wherein the plurality of round ridges are connected to the plurality of round furrows, such that the plurality of round ridges and the plurality of round furrows together form a sinusoidal wave shape.

3. The directional backlight unit of claim 1, wherein the light guide plate comprises a thermal resistance material which is transparent with respect to visible light, and the grating comprises a polymer material which is transparent with respect to visible light.

4. The directional backlight unit of claim 1, wherein a refractive index of the grating is substantially the same as a refractive index of the light guide plate.

5. The directional backlight unit of claim 1, wherein the grating comprises a sinusoidal wave shape.

6. The directional backlight unit of claim 5, wherein a refractive index of the grating is substantially the same as a refractive index of the light guide plate.

7. The directional backlight unit of claim 6, wherein the grating comprises a transparent resin material.

8. The directional backlight unit of claim 1, wherein, a shape of the grating is configured such that, a square of a first Fourier coefficient of a Fourier transformation performed on the shape of the grating is greater than a sum of squares of remaining Fourier coefficients including a second Fourier coefficient of the Fourier transformation.

9. The directional backlight unit of claim 8, wherein the shape of the grating is configured such that Fourier coefficients, except the first Fourier coefficient, of the Fourier transformation performed on the shape of the grating, are substantially zero.

10. A 3D image display device comprising:
   the directional backlight unit according to claim 1; and
   a display panel disposed on the light-emitting surface of the directional backlight unit.

* * * * *